Jan. 18, 1949.    L. L. TROUTMAN    2,459,473
SELF-LOADING AUTOMOTIVE TRUCK
Filed Oct. 30, 1946    3 Sheets-Sheet 1
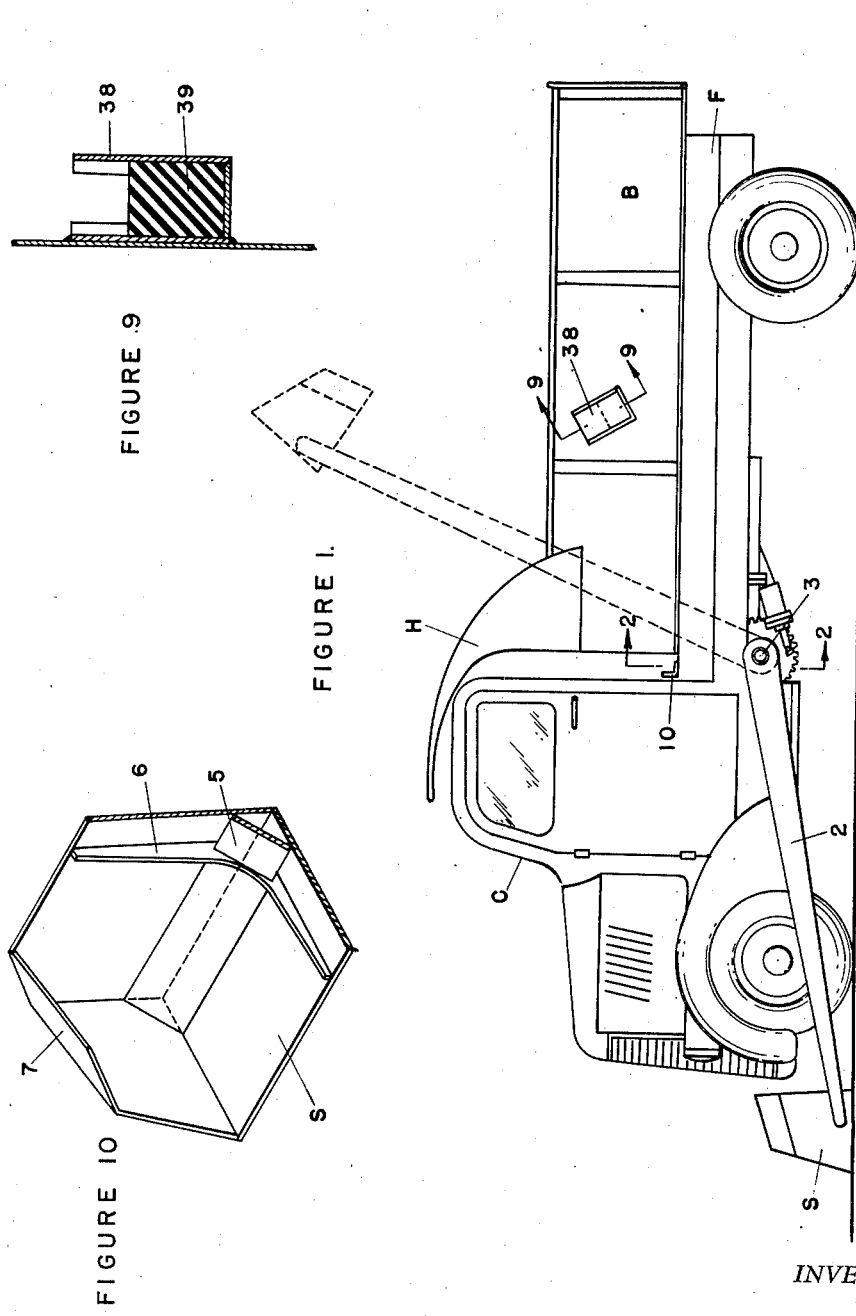
INVENTOR.
LESTER L. TROUTMAN
BY Victor J. Evans & Co.
ATTORNEYS Jan. 18, 1949.　　　　L. L. TROUTMAN　　　　2,459,473
SELF-LOADING AUTOMOTIVE TRUCK
Filed Oct. 30, 1946　　　　　　　　　　　3 Sheets-Sheet 2
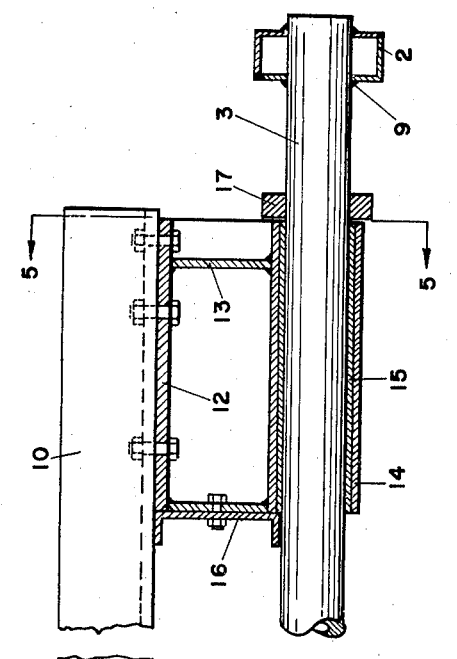
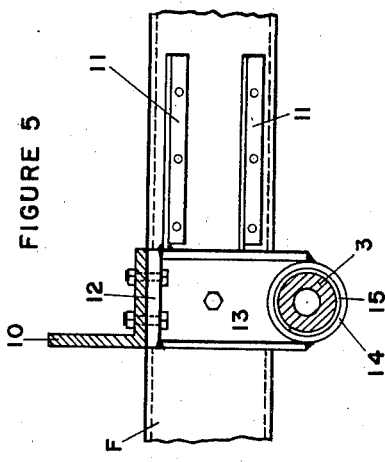
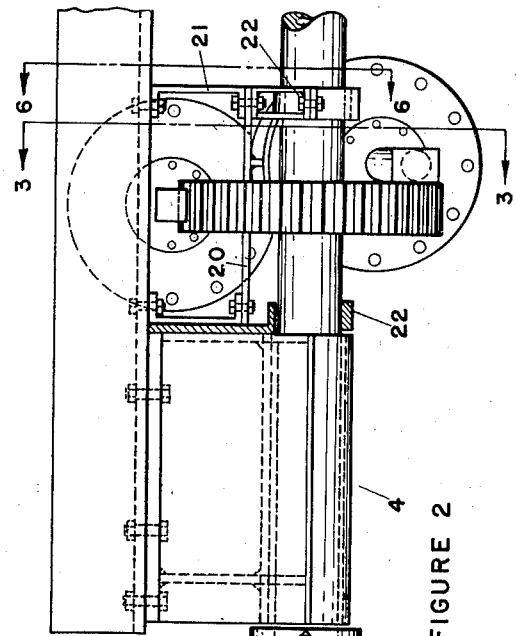
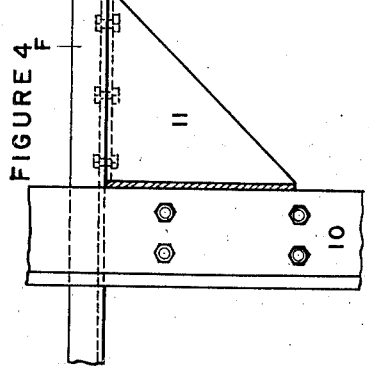
*INVENTOR.*
LESTER L. TROUTMAN
BY *Victor J. Evans & Co.*
ATTORNEYS

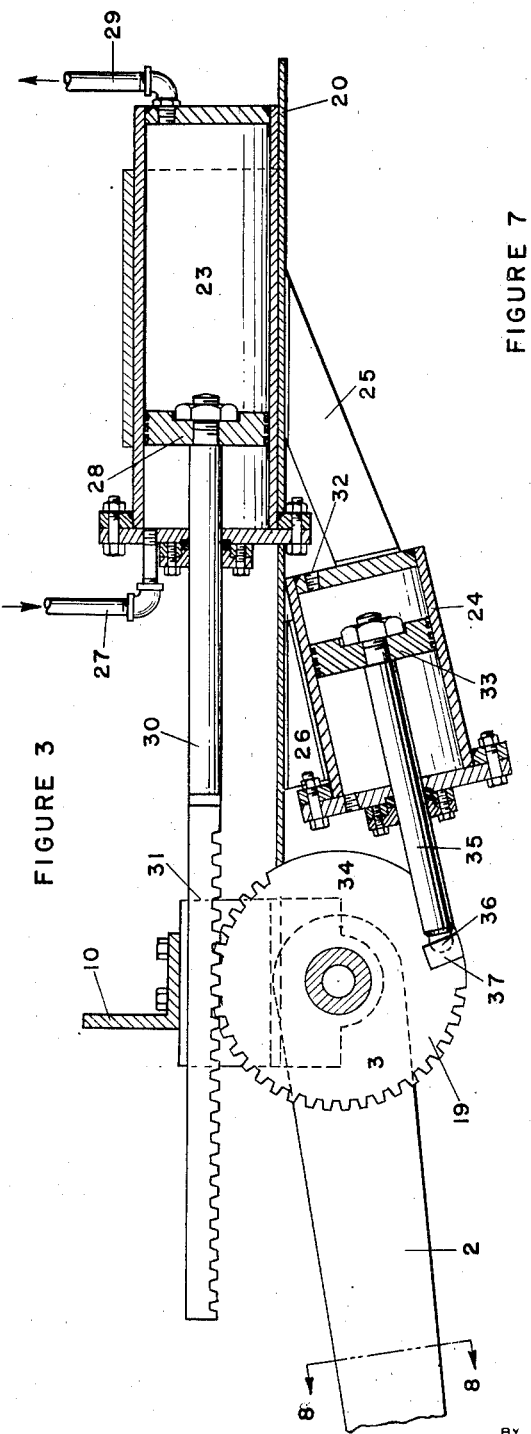

Patented Jan. 18, 1949

2,459,473

UNITED STATES PATENT OFFICE 2,459,473

SELF-LOADING AUTOMOTIVE TRUCK

Lester L. Troutman, El Monte, Calif.

Application October 30, 1946, Serial No. 706,622

2 Claims. (Cl. 214—78)

My present invention relates to an improved self-loading automotive truck of the type utilizing a vertically swinging load support in the form of a shovel or fork unit, adapted for snow removal from roadways, as well as for excavating, conveying, and loading soil and similar loose material of various kinds into the bed of the truck or carrier.

In the physical embodiment of my invention a motor truck is equipped with the self-loading mechanism, which includes the swinging shovel unit that is mounted for operation at the front of the truck and over the truck cab. In a loading operation, the shovel of the loading unit is plunged into the material by forward propulsion of the motor-truck, and then the load is swung vertically overhead and emptied into the truck bed, or into any other suitable receptacle.

The primary object of the invention is the provision of a manually controlled, hydraulic or fluid pressure operated, motive-power assembly, by means of which the power for initiating the swinging movement of the loaded shovel unit is boosted to insure smooth operation in lifting the load. For this purpose the motive power assembly includes a main pulling motor and an auxiliary pushing motor for operating the loaded shovel unit, and the combined initial application of power is counterbalanced in order to eliminate and prevent strains and stresses in the operating parts and their supports.

Means are also provided for supporting the shovel unit and the motive power assembly in proper operative relation to the truck or vehicle, in order that the efficiency of these operating parts is not impaired, but maintained, regardless of irregularities in the ground surfaces over which the truck is operating.

The invention consists in certain novel combinations and arrangements of parts for carrying out these purposes and objects, as will hereinafter be more fully described, and set forth in the appended claims.

In the accompanying drawings I have illustrated one complete example of the physical embodiment of my invention wherein the parts are combined and arranged in accord with one mode I have thus far devised for the practical application of the principles of my invention, but it will be understood that changes and alterations may be made in these exemplifying drawings and mechanical structures, within the scope of my claims, without departing from the principles of the invention.

Figure 1 is a view in side elevation of a motor truck equipped with the loading mechanism of my invention, indicating by dotted lines the position of the shovel unit when emptying its load into the truck-bed.

Figure 2 is a detail, enlarged, view, with parts in section, showing the transversely extending rock-shaft of the shovel unit and its bearings, together with parts of the two motors and related parts.

Figure 3 is a vertical sectional view, longitudinally of the truck, as at line 3—3 of Fig. 2, showing the relation of the main motor and the booster motor to the rack and gear connections.

Figure 4 is an enlarged fragmentary detail view showing a joint between the supporting crossbeam and the main frame of the truck.

Figure 5 is a sectional detail view at line 5—5 of Fig. 2 showing one of the box bearings or hangers for supporting the rock-shaft from the transverse beam.

Figure 6 is a vertical, sectional, detail view, at line 6—6 of Fig. 2 showing one of the bearing supports for the motive power assembly.

Figure 7 is a view in elevation, transversely of the truck, showing the structure of Fig. 6, as seen from the right side thereof.

Figure 8 is an enlarged, detail sectional view through one of the side arms of the shovel unit disclosing the use of welded plates in the formation of the tubular arm, at line 8—8, Fig. 3.

Figure 9 is an enlarged detail sectional view, as at line 9—9 of Fig. 1, showing one of the bumpers or abutments mounted on the outer sides of the truck bed for reception of the side arms at the termination of the working stroke of the shovel unit.

Figure 10 is an enlarged detail sectional view of the shovel or scoop forming part of the shovel unit.

In the assembly view of Fig. 1, the invention is shown as embodied in a conventional automotive truck of the four-wheel type, having a bed B and the usual underframe F composed of longitudinally extending channel beams, and provided with a cab C that is protected from falling excess material by an overhanging canopy or hood H supported at the rear of the cab and projecting forwardly thereover to shield the cab from spilled material.

Power is supplied, for hydraulic pressure utilized in the operation of the shovel unit, from the motor of the truck, and suitable means are employed for controlling the hydraulic pressure in the swinging movements of the shovel unit. The power plant and controls, being of conventional form and unnecessary for a disclosure of the present invention, are not herein illustrated nor described.

The shovel S operating at the front of the truck and adapted to swing vertically overhead in its loading operations, is rigidly mounted transversely of the truck at the front ends of a pair of laterally spaced tubular side arms 2, 2, and these arms are rigidly mounted at their rear ends upon a horizontal, tubular, transversely extending rock-shaft 3 having journals in a pair of spaced outboard bearings 4, 4, at opposite sides of the truck.

The shovel or scoop S, the two side arms, and the rock-shaft are preferably welded together to form a rigid unit for gathering or collecting a load, and for conveying and dumping the supported load, by an overhead swing, into the bed of the truck.

As seen in Fig. 10, the open front shovel or scoop S is fashioned of sheet metal with an interior corner plate 5 and upright reinforcing gussets 6, 6, all welded together, and the opposite sides of the shovel at their upper edges are inwardly bent to form wings 7, 7, for guiding the material as it pours from the uplifted shovel in the act of dumping.

The mechanical structure of the side arms is shown in Figs. 2 and 8 as comprising two opposed angle irons, welded together at the diagonal corners 8, 8, to form a strong tubular arm of comparatively light weight, and the rear ends of these arms are welded, as at 9, 9, to the rock-shaft 3 to form a rigid shovel unit.

The rock-shaft is journaled in the outboard bearings 4, 4, that are suspended or hung from an angle iron supporting beam 10 extending transversely of the truck and mounted upon the top of the longitudinally extending frame members F, F, of the truck to which it is bolted, and braced by means of triangular gussets 11, 11.

In Figs. 2 and 5 the boxes or hangers for the two bearings, indicated as a whole by the numerals 4, 4, are each composed of upper attaching plates 12 by means of which they are bolted to the transverse beam 10 and end plates 13, 13, welded thereto. These end-plates have semicircular lower ends that fit over and are welded to a cylindrical bearing sleeve 14 that encloses the brass journal liner 15 of the bearing, and an end channel plate 16 is bolted at the inner end of the bearing box as a brace between the box hanger and the cross beam 10.

The two bearings for the right hand and left hand journals of the shaft are similar, and they are retained against relative movement of the shaft and bearings by means of retaining collars 17, 17, that are fixed on the shaft by set bolts 18, 18 in Fig. 2.

For use in rocking or oscillating the rock-shaft in the dumping and return movements of the shovel unit, I employ a toothed wheel or gear 19 rigidly mounted near the longitudinal center of the shaft, and below the cross beam 10; and two hydraulic power devices or appliances are utilized to apply power through the gear for rocking the shaft.

A main hydraulic motor is controlled and operated to exert a pulling action on the upper segment of the gear ring 19 to rock the shaft; and for initial lifting movement of the load an auxiliary hydraulic motor, or booster, is simultaneously controlled and operated to impart a push against the lower segment of the gear 19. Under the combined push and pull of the motors the inertia of the load is readily overcome under the maximum applied power, the application of power to the gear wheel is balanced, and excessive or undue strains are eliminated that would otherwise affect the supports and the truck frame.

After the booster motor has performed its function, and the loaded shovel has attained its swinging movement, the hydraulic pressure of the auxiliary motor is reduced, and the pushing action of the booster is stopped, while the continuing movement or swing of the shovel is maintained and controlled by the main motor.

After the load has been emptied, the shovel is swung down to operative position for another load, under control of the main motor, and brought again into operative relation to the auxiliary motor to assist in lifting a succeeding shovel-load.

The motive-power unit, including the main and auxiliary motors, is mounted upon a base plate 20, which is disposed horizontally above the rock shaft and below the co-planer cross beam 10, and as best seen in Figs. 6 and 7, the base plate is supported between brackets 21, or channel plates, bolted at the underside of the cross beam, and bearings 22 that are detachably bolted upon the tubular rock shaft 3.

As indicated in Fig. 3, the main hydraulic cylinder 23 is mounted on the base plate 20, longitudinally of the truck and in horizontal position, in alignment with the rack-wheel or gear; and the auxiliary cylinder 24 is mounted in arms 25 and bracket 26 rigid with the base plate, diagonally or obliquely to the longitudinal axis of the main cylinder.

The motive-power assembly, including the supporting frame, is thus mounted as a unit on the rock-shaft and the cross beam, comparatively free from disturbance by relative movements between adjoining parts of the vehicle.

For a working stroke or loading stroke of the shovel unit hydraulic pressure is supplied, under control, through pipe 27 to a port at one end of the cylinder, against the piston 28; and low pressure fluid exhausts through a port at the opposite end through pipe 29 of the hydraulic system.

The piston head 28 is equipped with a stem 30 to which a rack bar 31 is welded and forms a rigid front extension for co-action with the gear 19 in rocking the shaft and swinging the shovel unit.

For a return swing of the shovel unit, under manual control, high pressure is admitted through pipe 29 to the cylinder against the piston, and low pressure fluid is exhausted through the pipe 27.

The obliquely disposed cylinder 24, like the horizontal cylinder 23, is arranged longitudinally in a plane tangential to the axis of rotation of the rock-shaft and the gear 19, and the booster motor of which cylinder 24 forms a part is adapted to impart an initial push against the gear when hydraulic pressure under control is admitted through port 32 at the rear end of the cylinder.

A piston 33 within the cylinder 24 is moved under high fluid pressure and low fluid pressure is exhausted through port 34 at the front end of the cylinder. This piston 33 is equipped with a stem 35 that terminates at its free end in a ball or head 36, which frictionally co-acts with and fits into a socket-head 37 rigidly mounted on the gear 19 adjacent its periphery.

After the performance of its function in imparting an initial push to the gear 19, the ball of the piston stem, or plunger 35, is automatically disconnected from the socket-head 37 due to the rotary movement of the gear, which is clockwise in Fig. 3.

During the continued loading swing of the shovel unit the head 36 of the booster remains in the circular path of the socket-head 37, so that, upon the return swing of the shovel unit the socket-head will again contact the ball, and co-act therewith in a succeeding push against the gear. The fluid pressure in both of the cylinders 23 and 24, under manual control, is coordinated during the working or loading swing, and the return swing of the shovel unit, and when the piston 33 is backed up high pressure is admitted to the front end of cylinder 24 through port 34, and low fluid pressure is exhausted through port 32 in the closed circuits of the hydraulic system.

At the end of the loading swing of the shovel unit, the side arms 2, 2, encounter bumpers 38, one mounted on the outer surface of each of the side walls of the truck bed, and as seen in Fig. 9, these bumpers or abutments include a slotted metallic casing equipped with a resilient pad 39 adapted to absorb the shock of contact between the arms and the bumpers.

During the return swing of the shovel-unit the booster motor is not used, but the main motor imparts a pushing action on the rack gear to rock the shaft and swing the shovel, and as the shovel approaches the end of its swing, the booster may be employed to assist in stopping the swing of the shovel.

Having thus fully described my invention, what I claim as new and desire to secure by Letters Patent is:

1. A self-loading automotive truck having a chassis and a dump body mounted thereon, brackets depending from the chassis, a shaft extending through the brackets and the opposite sides of the chassis, arms rigidly secured respectively to the outer ends of the shaft, a scoop connected to the outer ends of the arms and adapted to be extended forwardly of the truck to pick up material and to be lifted by the arms over the front of the truck to deposit the material in the dump body, said shaft having a large gear thereon between the brackets, a double acting fluid cylinder device connected to the chassis and having a rack adapted to be extended onto the large gear to rotate the same, said gear having a projection offset from the side of the same, a booster cylinder device connected to the chassis below the double acting cylinder adapted to engage the projection of the large gear when the scoop is in its lowered position ahead of the truck, and adapted to assist the double acting cylinder device to effect the upward rotation of the arms to lift the scoop.

2. A self-loading automotive truck as defined in claim 1 and stop means disposed at the opposite sides of the truck and comprising a box-like structure open at its top and sides, a resilient block supported within the structure and adapted to be engaged by the arms to limit their downward movement, said box structure being adapted to guide the downward movement of the arms through the last part of their stroke and to prevent their lateral displacement relative to the truck body.

LESTER L. TROUTMAN.

REFERENCES CITED

The following references are of record in the file of this patent:

UNITED STATES PATENTS

| Number | Name | Date |
| --- | --- | --- |
| 2,020,231 | Bell | Nov. 5, 1935 |
| 2,220,815 | Feilcke | Nov. 5, 1940 |
| 2,286,723 | Frost | June 16, 1942 |
| 2,353,655 | Day | July 18, 1944 |